(12) United States Patent
Walle-Jensen

(10) Patent No.: US 12,521,019 B2
(45) Date of Patent: Jan. 13, 2026

(54) SYSTEMS AND METHODS OF RELATIVE ONSET FLUORESCENCE DELAY FOR MEDICAL IMAGING

(71) Applicant: Stryker Corporation, Kalamazoo, MI (US)

(72) Inventor: Jørgen Walle-Jensen, Vancouver (CA)

(73) Assignee: Stryker Corporation, Portage, MI (US)

( * ) Notice: Subject to any disclaimer, the term of this patent is extended or adjusted under 35 U.S.C. 154(b) by 339 days.

(21) Appl. No.: 17/455,011

(22) Filed: Nov. 15, 2021

(65) Prior Publication Data

US 2022/0151495 A1 May 19, 2022

Related U.S. Application Data

(60) Provisional application No. 63/114,469, filed on Nov. 16, 2020.

(51) Int. Cl.
*A61B 5/00* (2006.01)
*G06T 7/00* (2017.01)
(Continued)

(52) U.S. Cl.
CPC .......... *A61B 5/0082* (2013.01); *A61B 5/0071* (2013.01); *A61B 5/74* (2013.01);
(Continued)

(58) Field of Classification Search
CPC ....... A61B 5/0082; A61B 5/0071; A61B 5/74; A61B 2576/00; A61B 5/0037;
(Continued)

(56) References Cited

U.S. PATENT DOCUMENTS 5,743,266 A * 4/1998 Levene .................... A61B 8/06
600/458
9,662,407 B2 5/2017 Boyd
(Continued)

OTHER PUBLICATIONS

International Preliminary Report on Patentability dated May 16, 2023, directed to International Application No. PCT/US2021/072411; 12 pages.
International Search Report and Written Opinion mailed Mar. 16, 2022, directed to International Application No. PCT/US2021/072411; 17 pages.
Intention to Grant dated Feb. 26, 2025, directed to EP Application No. 21 844 161.6; 7 pages.

*Primary Examiner* — Anh Tuan T Nguyen
*Assistant Examiner* — Dean N Edun
(74) *Attorney, Agent, or Firm* — Morrison & Foerster LLP

(57) ABSTRACT

Disclosed herein are systems and methods that can assess whether there is an issue with tissue perfusion, which can help a clinician better predict any surgical complications that may arise. Fluorescence images of the tissue of a subject can continuously be observed until a portion of the tissue that first perfused with blood containing one or more fluorescent agents is at peak fluorescence. Any areas of the tissue from the fluorescence images that remain dark can be further observed until these areas of concern show their first sign of fluorescence. The time it takes for these areas of concern to show their first signs of fluorescence since the first onset of fluorescence in the tissue can be referred to as the relative onset fluorescence delay. If the relative onset fluorescence delay time is greater than a predetermined threshold, the clinician can alter or change the surgical plan.

11 Claims, 9 Drawing Sheets

(51) Int. Cl.
*G16H 20/40* (2018.01)
*G16H 30/40* (2018.01)

(52) U.S. Cl.
CPC ........... *G06T 7/0012* (2013.01); *G16H 20/40* (2018.01); *G16H 30/40* (2018.01); *G06T 2207/10064* (2013.01); *G06T 2207/30068* (2013.01)

(58) Field of Classification Search
CPC ..... A61B 5/0077; A61B 5/0261; A61B 5/444; A61B 5/7275; A61B 5/746; G06T 7/0012; G06T 2207/10064; G06T 2207/30068; G16H 20/40; G16H 30/40
See application file for complete search history.

(56) References Cited

U.S. PATENT DOCUMENTS

| | | | |
|---|---|---|---|
| 2017/0061613 A1* | 3/2017 | Karczmar | G06T 7/0016 |
| 2017/0202540 A1* | 7/2017 | Shao | A61B 8/5223 |
| 2018/0158187 A1 | 6/2018 | Gurevich | |
| 2020/0146564 A1 | 5/2020 | Lund | |
| 2021/0161407 A1* | 6/2021 | Gush | A61B 5/7207 |
| 2022/0313092 A1* | 10/2022 | Daures | A61B 90/36 |

* cited by examiner

SYSTEMS AND METHODS OF RELATIVE ONSET FLUORESCENCE DELAY FOR MEDICAL IMAGING

CROSS-REFERENCE TO RELATED APPLICATIONS

This application claims the benefit of U.S. Provisional Application No. 63/114,469, filed Nov. 16, 2020, the entire contents of which are hereby incorporated by reference herein.

FIELD

The present disclosure relates generally to medical imaging systems and methods, and more particularly to systems and methods of medical imaging for predicting surgical complications based on tissue perfusion.

BACKGROUND

Medical imaging systems (e.g., endoscopic imaging systems for minimally-invasive surgery or open field medical imaging systems) can help provide clinical information for medical practitioners who need to make decisions (e.g. intraoperative or treatment decisions) based on visualization of tissue. In many applications, it is useful for medical imaging systems to provide fluorescence imaging for visualization of tissue that cannot be visualized or is poorly visualized with white light imaging. Fluorescence imaging generally involves the administration of a bolus of an imaging agent that circulates throughout the subject's tissue and emits a fluorescence signal when illuminated with the appropriate excitation light. Fluorescence imaging can be performed on a subject's tissue to which an imaging agent had been pre-administered. Fluorescence imaging systems acquire images of the emitted imaging agent fluorescence as the imaging agent bolus traverses the subject's tissue in the imaging field of view. When the images are displayed on a display, clinicians may observe the imaging agent as well as differences in fluorescence intensity associated with the imaging agent in the imaging field of view. Based on their visual perception of the fluorescence intensity, clinicians may make qualitative determinations regarding the tissue in the imaging field of view.

SUMMARY

According to an aspect, systems and methods can assess whether there is an issue with tissue perfusion, which can help a clinician better predict any surgical complications that may arise. According to an aspect, fluorescence images of the tissue of a subject generated from the fluorescence emission of a fluorescence agent are continuously observed until a portion of the tissue that was first perfused with blood containing the agent is at peak fluorescence. Any areas of the tissue from the fluorescence images that remain dark can be further observed until these areas of concern show their first signs of fluorescence. The time it takes for these areas of concern to first show signs of fluorescence since the first onset of fluorescence in the tissue is referred to as the relative onset fluorescence delay.

According to an aspect, the relative onset fluorescence delay time can provide the clinician with a tool for predicting any surgical complications that may occur. An area of concern in the tissue can mean that this portion of the tissue is not properly receiving the exchange of gases and nutrients between the blood and the body's cells. If the relative onset fluorescence delay time is greater than a predetermined threshold, the clinician can alter or change the surgical plan. For example, the clinician can surgically remove the area of concern or a subset of this area if they believe the relative onset fluorescence delay time is too high for the tissue to be likely to become or remain viable; the clinician can delay any reconstructive surgery to minimize strain on the tissue of concern; the planned expander volume can be reduced or an already placed expander can be reduced in volume to reduce stretching and pressure on the tissue of concern; the planned implant can be reduced or the surgical plan can switch from direct to implant to an expander approach to reduce the amount of stretching and pressure on the tissue of concern; and/or treatment for possible complications can start immediately such as nitro paste, hyperbaric treatment, offloading, etc. to stimulate increased blood flow and increase healing properties of the body.

According to an aspect, a method includes receiving fluorescence image data representing an image of tissue of a subject; determining when a portion of the tissue has a fluorescence intensity value that is greater than a first predetermined threshold intensity value; determining when the portion of the tissue has a fluorescence intensity value that is greater than a second predetermined threshold intensity value; in response to determining when the portion of tissue has a fluorescence intensity value that is greater than the second predetermined threshold intensity value, identifying at least one area of the portion of the tissue having a fluorescence intensity value that is less than a third predetermined threshold intensity value; determining when the at least one area of the portion of the tissue has a fluorescence intensity value that is greater than a fourth predetermined threshold intensity value; calculating time between when the at least one area of the portion of tissue has a fluorescence intensity value that is greater than the fourth predetermined threshold intensity value and when the portion of the tissue has a fluorescence intensity value that is greater than the first predetermined threshold intensity value; and if the calculated time is greater than a predetermined time, providing a notification based on the calculated time being greater than the predetermined time.

According to an aspect, a method includes receiving fluorescence image data representing an image of tissue of a subject; determining when a portion of the tissue has a fluorescence intensity value that is greater than a first predetermined threshold intensity value; at a first predetermined time after determining when the portion of the tissue has a fluorescence intensity value that is greater than the first predetermined threshold intensity value, identifying at least one area of the portion of the tissue having a fluorescence intensity value that is less than a second predetermined threshold intensity value; determining when the at least one area of the portion of the tissue has a fluorescence intensity value that is greater than a third predetermined threshold intensity value; calculating time between when the at least one area of the portion of the tissue has a fluorescence intensity value that is greater than the third predetermined threshold intensity value and when the portion of the tissue has a fluorescence intensity value that is greater than the first predetermined threshold intensity value; and if the calculated time is greater than a second predetermined time, providing a notification that the tissue might have a complication.

According to an aspect, a system comprising one or more processors is configured to cause the system to: receive fluorescence image data representing an image of tissue of a subject; determine when a portion of the tissue has a fluorescence intensity value that is greater than a first predetermined threshold intensity value; determine when the portion of the tissue has a fluorescence intensity value that is greater than a second predetermined threshold intensity value; in response to determining when the portion of tissue has a fluorescence intensity value that is greater than the second predetermined threshold intensity value, identify at least one area of the portion of the tissue having a fluorescence intensity value that is less than a third predetermined threshold intensity value; determine when the at least one area of the portion of the tissue has a fluorescence intensity value that is greater than a fourth predetermined threshold intensity value; calculate time between when the at least one area of the portion of tissue has a fluorescence intensity value that is greater than the fourth predetermined threshold intensity value and when the portion of the tissue has a fluorescence intensity value that is greater than the first predetermined threshold intensity value; and if the calculated time is greater than a predetermined time, provide a notification that the tissue might have a complication.

According to an aspect, a non-transitory computer-readable storage medium stores instructions configured to be executed by a system comprising one or more processors to cause the system to: receive fluorescence image data representing an image of tissue of a subject; determine when a portion of the tissue has a fluorescence intensity value that is greater than a first predetermined threshold intensity value; determine when the portion of the tissue has a fluorescence intensity value that is greater than a second predetermined threshold intensity value; in response to determining when the portion of tissue has a fluorescence intensity value that is greater than the second predetermined threshold intensity value, identify at least one area of the portion of the tissue having a fluorescence intensity value that is less than a third predetermined threshold intensity value; determine when the at least one area of the portion of the tissue has a fluorescence intensity value that is greater than a fourth predetermined threshold intensity value; calculate time between when the at least one area of the portion of tissue has a fluorescence intensity value that is greater than the fourth predetermined threshold intensity value and when the portion of the tissue has a fluorescence intensity value that is greater than the first predetermined threshold intensity value; and if the calculated time is greater than a predetermined time, provide a notification that the tissue might have a complication.

Optionally, the second predetermined threshold intensity value is greater than the first predetermined threshold intensity value.

Optionally, determining when the portion of the tissue has a fluorescence intensity value that is greater than the second predetermined threshold intensity value comprises determining when the portion of the tissue has a peak fluorescence intensity that is greater than the second predetermined threshold intensity.

Optionally, determining when the portion of the tissue has a fluorescence intensity value that is greater than the second predetermined threshold intensity value comprises determining when the portion of the tissue has an average fluorescence intensity that is greater than the second predetermined threshold intensity.

Optionally, the third predetermined threshold intensity value is less than the first predetermined threshold intensity value.

Optionally, the first predetermined threshold intensity value and the fourth predetermined threshold intensity value are the same.

Optionally, determining when the at least one area of tissue has a fluorescence intensity value that is greater than the fourth predetermined threshold intensity value comprises determining when at least one sub area within the at least one area of the tissue has a fluorescence intensity value that is greater than the fourth predetermined threshold intensity value.

Optionally, the fluorescence image data representing an image of a subject is continuously received.

Optionally, the predetermined time is 10 seconds.

Optionally, the fluorescence intensity value of the portion of the tissue is an average fluorescence intensity value of the portion of the tissue.

Optionally, the fluorescence intensity value of the at least one area of the portion of the tissue is an average fluorescence intensity value of the at least one area of the portion of the tissue.

Optionally, if the time is greater than a predetermined time, a method may include altering a surgical plan for the subject.

Optionally, if the time is greater than a predetermined time, a method may include providing a notification to consider altering a surgical plan for the subject.

Optionally, providing a notification based on the calculated time being greater than the predetermined time comprises providing a notification that the tissue may have a complication.

According to an aspect, a kit for imaging tissue includes a fluorescence imaging agent and any one of the systems above.

It will be appreciated that any of the variations, aspects, examples, features and options described in view of the methods apply equally to the systems and storage mediums and vice versa. It will also be clear that any one or more of the above variations, aspects, features and options can be combined.

Additional advantages will be readily apparent to those skilled in the art from the following detailed description. The examples, aspects, and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

Features will become apparent to those of ordinary skill in the art by describing in detail exemplary examples with reference to the attached drawings in which.

DETAILED DESCRIPTION

Figure 1:
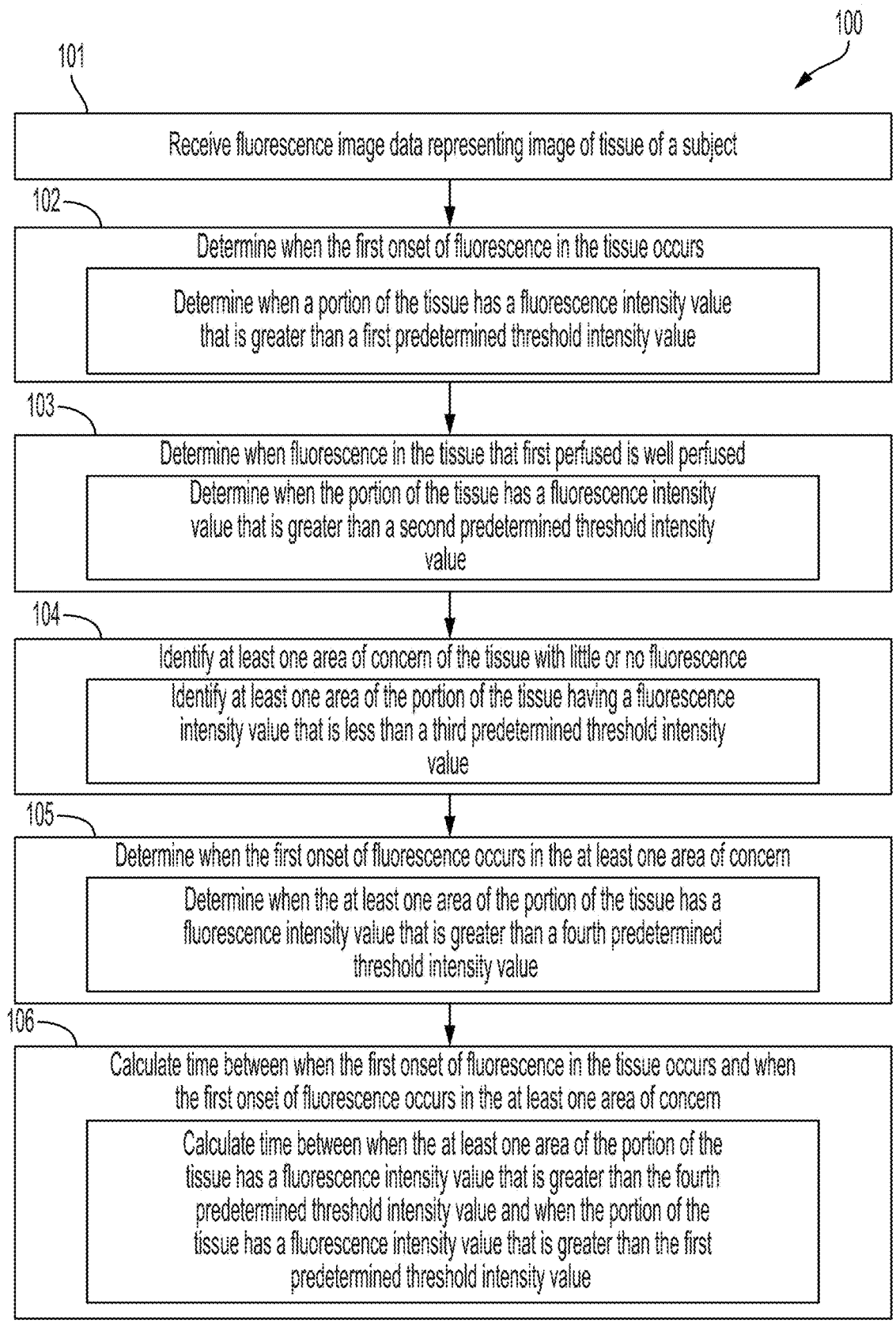
FIG. 1 shows a method for assessing the relative onset fluorescence delay of tissue perfusion in accordance with some examples disclosed herein.

Reference will now be made in detail to implementations and examples of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods according to various examples for assessing whether there is an issue with tissue perfusion, which can help a clinician better predict any surgical complications that may arise. According to some examples, fluorescence images of the tissue of a subject generated from the fluorescence emission of a fluorescence agent are continuously observed until a portion of the tissue that was first perfused with blood containing the agent is at peak fluorescence. Any areas of the tissue from the fluorescence images that remain dark can be further observed until these areas of concern show their first signs of fluorescence. The time it takes for these areas of concern to first show signs of fluorescence since the first onset of fluorescence in the tissue is the relative onset fluorescence delay. The relative onset fluorescence delay time can provide the clinician with a tool for predicting surgical complications that may occur. An area of concern in the tissue can mean that this portion of the tissue is not properly receiving the exchange of gases and nutrients between the blood and the body's cell. As such, the clinician can adjust his or her surgical plans if this area of concern has ineffective tissue perfusion.

The systems and methods described herein can be used to predict any potential tissue perfusion complications (e.g., surgical complications), helping a clinician to more effectively treat the patient and avoid such complications. According to some examples, imaging, according to the methods and systems described herein, can be performed in any surgical procedure involving tissue perfusion such as, but not limited to: (a) any assessment of tissue perfusion in native tissue or flaps; (b) procedures related to head and neck, amputation, and trauma; and/or (c) procedures where delay of perfusion can be an important factor in tissue viability (e.g., colorectal surgery and esophagectomy).

In the following description of the various examples, reference is made to the accompanying drawings, in which are shown, by way of illustration, specific examples that can be practiced. It is to be understood that other examples can be practiced, and changes can be made without departing from the scope of the disclosure.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some examples also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Methods for Predicting Surgical Complications Based on Tissue Perfusion

Figure 2:
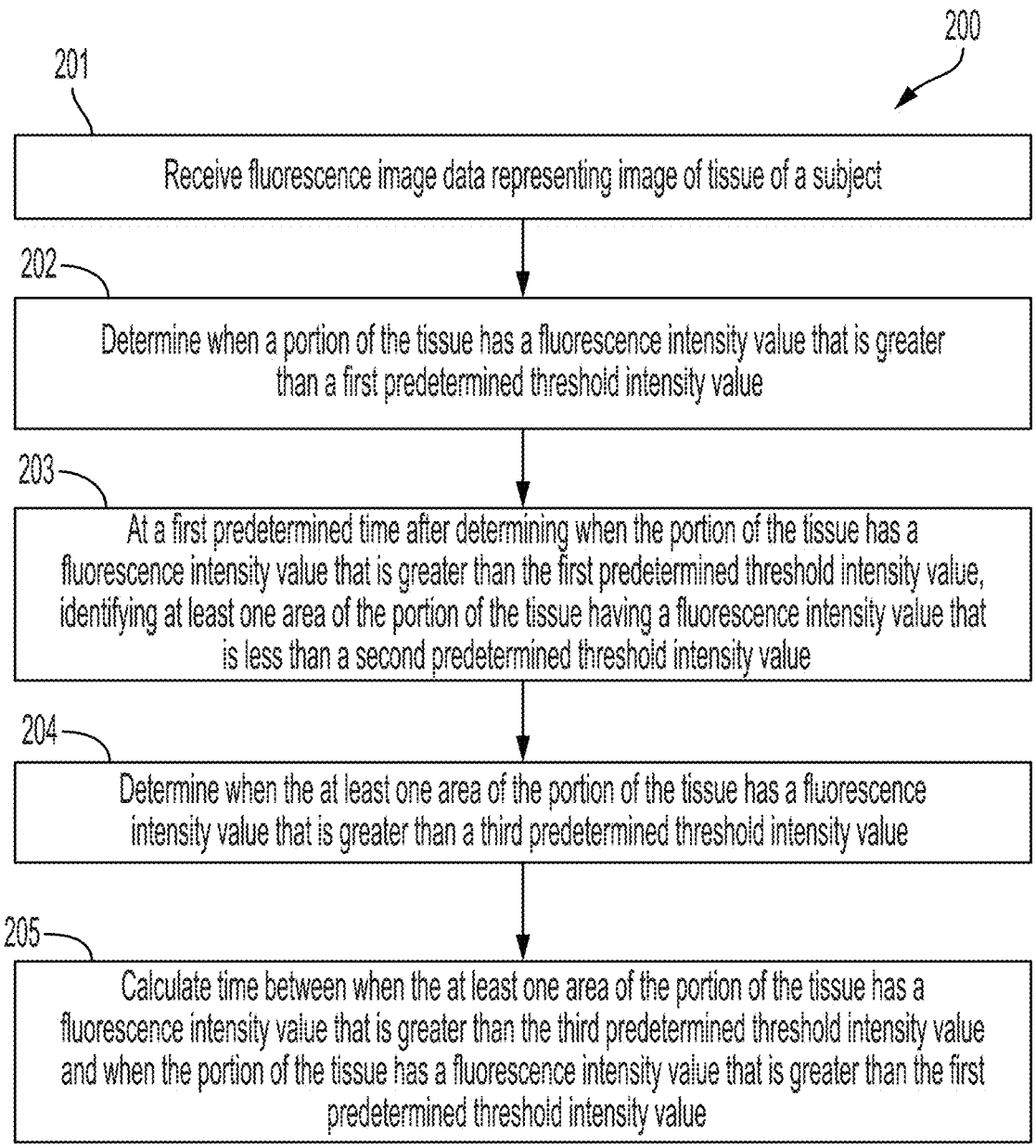
FIG. 2 shows another method for assessing the relative onset fluorescence delay of tissue perfusion in accordance with some examples disclosed herein.

FIGS. 1 and 2 illustrate methods 100 and 200 for assessing the relative onset fluorescence delay of tissue perfusion in accordance with some examples disclosed herein. Methods 100 and 200 can include predicting whether possible tissue perfusion issues may occur based on the relative onset fluorescence delay. In some examples, depending on the relative onset fluorescence delay for a portion or an area of the tissue of the subject being imaged, a clinician can decide whether to change or modify the surgical plan of the patient to avoid any potential complications.

Methods 100 and 200 may be performed by an imaging system, such as an imaging system that includes an imager for generating fluorescence images and one or more processors for processing the images according to methods 100 and 200. In some examples, methods 100 and 200 are performed by an image processing system that receives one or more images from an imaging system and/or from a memory in which one or more images are stored.

At step 101 and 201 of method 100 and 200 respectively, fluorescence image data of the tissue of a subject is received. The fluorescence image data may be received from an imager or imaging system or may be received from a memory in which a previously generated image is stored. The fluorescence image data can be a video frame or a single image. As used herein, the term fluorescence image data covers both single images and video frames. In some examples, the method can continuously receive the fluorescence image data over time. For example, the fluorescence image data can be a plurality of video or image frames of the tissue of the subject over time.

The fluorescence image can include a plurality of intensity values that are proportional to fluorescence emission from one or more fluorescence agents present in the tissue of the subject at the time that the image was generated. As the tissue becomes more and more perfused with blood containing the one or more fluorescence agents, the intensity values that are proportional to fluorescence emission in those areas of the tissue that are more perfused can increase or become brighter.

In some examples, the fluorescence image generated by the imager comprises an intensity value for each pixel in the imager. In some examples, the fluorescence image is based on an image generated by the fluorescence imager. For example, one or more processing steps may be performed after the generation of the fluorescence image by the fluorescence imager and the performance of step 101 of method 100 or step 201 of method 200. Examples of such processing steps include scaling, trimming, denoising, and normalizing. Accordingly, in some examples, the number of intensity values in the fluorescence image that is received at step 101 or 201 may be different than the number of pixels of the imager that generated the image from which the received fluorescence image was derived. In some examples, one or more image processing steps may be performed after the fluorescence image is received at step 101 or 201. For example, generating the enhanced fluorescence image may include one or more of a scaling step, a trimming step, a denoising step, and a normalizing step.

The intensity values can be associated with the region of the imaged tissue that the fluorescence agent is configured to target. A fluorescence imaging agent can be configured to target a tissue in a number of ways. For example, a fluorescence agent can be configured to preferentially accumulate in a tissue, such as a tumor, by binding to cells of the tissue. The fluorescence agent can e.g. target a tissue by activating in the presence of the targeted tissue. So, while the fluorescence agent may be present in non-targeted tissue, the agent fluoresces (or fluoresces more) when in the presence of the targeted tissue and does not fluoresce (or fluoresces less) when in the non-targeted tissue.

At step 102 or 202, a determination can be made when the first onset of fluorescence in the tissue occurs. Step 102 or 202 can include a determination when a portion of the tissue has a fluorescence intensity value that is greater than a first predetermined threshold intensity value. The first predetermined threshold intensity value can e.g. be about 5-10 out of 255 8 bit values. These values can relate to an 8 bit image (decimal values range from 0-255) for each pixel, and values can be extracted by either reading the pixel value in a grayscale image, or (more practical) can include a number of pixels in an area and averaging their pixel values. In some aspects, this can include percentage of max brightness as images can have higher bit depth than 8 bits. In some examples, the first predetermined threshold intensity value can be about 2-4% of maximum brightness and/or a low ingress rate of about 0.1-0.25 units of brightness increase per second. In some examples, the fluorescence intensity value is an average fluorescence intensity value of the pixels of the portion of the tissue from the image. The time at which this determination is made can be time 0.

The determination when a portion of the tissue has a fluorescence intensity value that is greater than a first predetermined threshold intensity value can include determining when the average intensity of the portion of the tissue has a fluorescence intensity value that is greater than a first predetermined threshold intensity value. In some examples, a field of view can be defined in the fluorescence image data received. The field of view can be the entire image of the tissue of the subject. Alternatively, the field of view can be at least one subset or portion of the image of the tissue of the subject. As such, the received fluorescence image may be divided into a plurality of segments. The average intensity value for each of these subsets or portions of the fluorescence image can be determined by the average intensity value of the pixels in each of these subsets or portions from the fluorescence image. When the average intensity value for a specific subset or portion of the fluorescence image exceeds a first predetermined threshold intensity value, the first onset of fluorescence in the tissue can occur. In some examples, when the average intensity value for any subset or portion of the fluorescence image of the tissue exceeds a first predetermined threshold intensity value, the first onset of fluorescence in the tissue can occur.

Figure 3A:
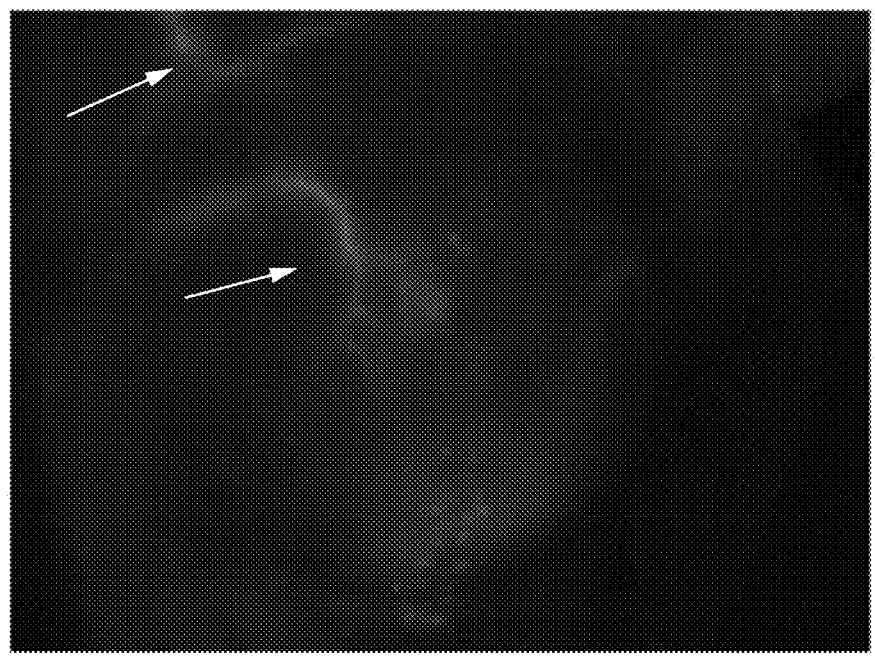
FIG. 3A illustrates a fluorescence image of tissue of a first subject when the first onset of fluorescence in the tissue occurs in accordance with some examples disclosed herein.
Figure 4A:
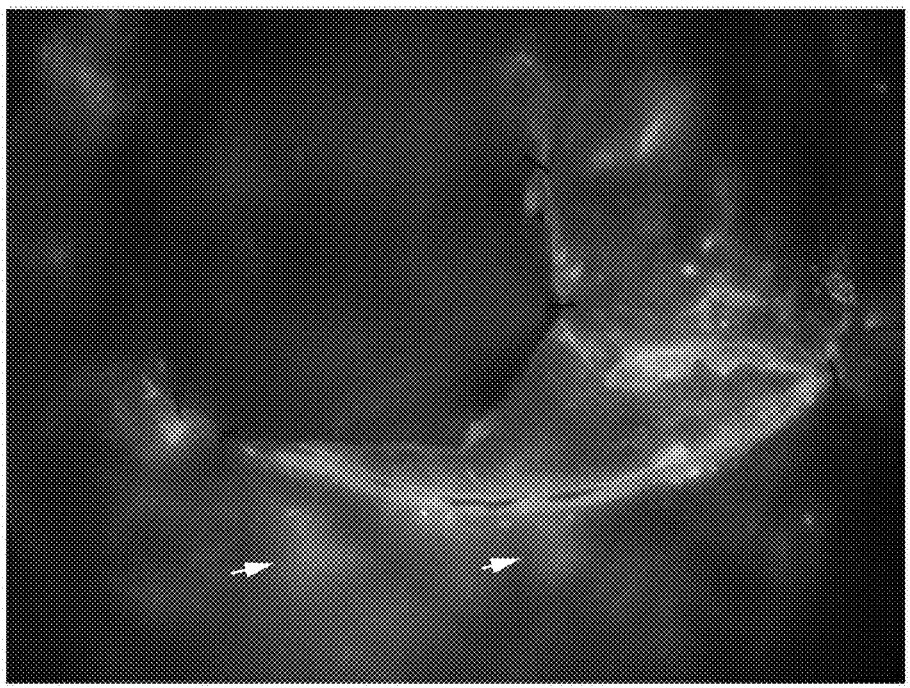
FIG. 4A illustrates a fluorescence image of tissue of a second subject when the first onset of fluorescence in the tissue occurs in accordance with some examples disclosed herein.

In some examples, the determination of when a portion of the tissue has a fluorescence intensity value greater than a first predetermined threshold intensity value can be made by an operator of the system based on the brightness of a portion of the tissue in the received fluorescence image. Alternatively, or additionally, the determination of when a portion of the tissue has a fluorescence intensity value greater than a first predetermined threshold intensity value can be made, e.g. automatically, by the system based on the brightness of a portion of the tissue in the received fluorescence image. For example, FIGS. 3A and 4A illustrates a fluorescence image of tissue of a first subject (3A) and a second subject (4A) when the first onset of fluorescence in the tissue occurs. Specifically, arrows are pointing to where fluorescence can be seen in the received image. This onset can be defined as time 0 (e.g., 0 seconds).

At step 103, the method can determine when fluorescence in the tissue that first perfused with blood containing the one or more fluorescence agents is well perfused with blood containing the one or more fluorescence agents. This can be when normal and healthy blood flow is occurring in the tissue. As explained above, as the tissue becomes more and more perfused with blood containing the one or more fluorescence agents, the intensity values that are proportional to fluorescence emission in those areas of the tissue that are more perfused can increase or become brighter. As such, step 103 can include determining when the portion of the tissue that first perfused is now well perfused. This can be a determination of when the portion of the tissue (i.e., portion of tissue that had initial onset of fluorescence) has a fluorescence intensity value that is greater than a second predetermined threshold intensity value. The threshold here can be something that indicates that there is no longer a large change in signal for (ideally healthy) tissue. This can mean that most of the fluorescence has entered this tissue. The second predetermined threshold can e.g. be an ingress rate that is no longer changing by more than 0.1 units of brightness per second, or a signal level that is a multiple of the starting intensity at time 0+5 seconds, for example. The second predetermined threshold can e.g. be 0.001-0.1 units of brightness increase per second or in the situation where there is post processing, as a percentage of max brightness for a given ROI (ROI could be the whole image). An example can be 85% of max brightness. The second predetermined threshold can e.g. be at t ½ of peak time. In some examples, the second predetermined threshold intensity value can be greater than the first predetermined threshold intensity value. Determining when the portion of the tissue has a fluorescence intensity value that is greater than the second predetermined threshold intensity value can include determining when the portion of the tissue has a peak fluorescence intensity that is greater than the second predetermined threshold intensity.

The determination when the portion of the tissue has a fluorescence intensity value that is greater than a second predetermined threshold intensity value can include determining when the average intensity of the portion of the tissue has a fluorescence intensity value that is greater than the predetermined threshold intensity value. In some examples, the field of view defined/determined in the received fluorescence image data is the same field of view used throughout the method. As such, the received fluorescence image may be divided into a plurality of segments and the plurality of segments can be used throughout the method. The average intensity value for each of these subsets or portions of the fluorescence image can be determined by the average intensity value of the pixels in each of these subsets or portions from the fluorescence image. When the average intensity value for the specific subset or portion of the fluorescence image that experienced initial onset of fluorescence exceeds a second predetermined threshold intensity value, the tissue can be well perfused. In some examples, when the average intensity value for any subset or portion of the fluorescence image of the tissue that experienced initial onset of florescence exceeds a second predetermined threshold intensity value, the tissue can be well perfused. In some examples, the tissue is well perfused when first blush of the tissue occurs, after onset. In some examples, the tissue is well perfused when it reaches peak fluorescence. In some examples, the determination of when the portion of the tissue has a fluorescence intensity value greater than a second predetermined threshold intensity value can be made by an operator of the system based on the brightness of a portion of the tissue in the received fluorescence image. Alternatively, or additionally, the determination of when the portion of the tissue has a fluorescence intensity value greater than a second predetermined threshold intensity value can be made, e.g. automatically, by the system based on the brightness of a portion of the tissue in the received fluorescence image.

At step 104, in response to determining when the fluorescence in the tissue that first perfused is well perfused, at least one area of concern of the tissue that has little or no fluorescence can be identified. Areas of concern can be dark and have very little fluorescence (if any) and can be identified by areas of dark/black pixels which are low in value, with black being 0. These areas of concern can be the areas of the image of tissue that are still dark at the time the portion of the tissue that first perfused with blood containing the one or more fluorescence agents is well perfused. These areas can be considered potential areas of concern because the tissue in these areas may not be perfusing whereas other areas of the tissue have already reached peak or close to peak perfusion with blood containing the one or more fluorescence agents. As such, in response to determining when the portion of the tissue (i.e., portion of tissue that had first onset of fluorescence) has a fluorescence intensity value that is greater than a second predetermined threshold intensity value, at least one area of the portion of the tissue having a fluorescence intensity value that is less than a third predetermined threshold intensity value can be identified. In some examples, the third predetermined threshold intensity value is less than the first predetermined threshold intensity value. In some examples, the third predetermined threshold intensity value can be about 0-3 out of 255 8 bit values and/or about 0-1% of max brightness.

In some examples, at a predetermined time after determining when the portion of the tissue has a fluorescence intensity value that is greater than the first predetermined threshold intensity value, at least one area of the portion of the tissue having a fluorescence intensity value that is less than a (third) predetermined threshold intensity value can be identified as shown in step 203 of method 200. The predetermined time can e.g. be the average time for normal tissue to be well perfused.

Identifying at least one area of the portion of the tissue having a fluorescence intensity value that is less than a third predetermined threshold intensity value can include identifying at least one area of the portion of the tissue having an average fluorescence intensity value that is less than a third predetermined threshold intensity value. In some examples, the at least one area of the portion of the tissue can be a subset of the field of view that was defined in the fluorescence image data that was received. As such, the received fluorescence image that was divided into a plurality of segments can further be divided into a subset of the plurality of segments. The average intensity value for each of these subsets or areas of the portions of the fluorescence image can be determined by the average intensity value of the pixels in each of these subsets or areas of the portions from the fluorescence image. Specific subset(s) or area(s) of portions of the fluorescence image that have an average intensity value less than a third predetermined threshold intensity value can be identified in response to determining when the portion of tissue that experienced first onset of fluorescence has a fluorescence intensity value that is greater than the second predetermined threshold intensity value. In some examples, any subset(s) or area(s) of portions of the fluorescence image that have an average intensity value less than a third predetermined threshold intensity value can be identified in response to determining when the portion of tissue that experienced first onset of fluorescence has a fluorescence intensity value that is greater than the second predetermined threshold intensity value.

Figure 3B:
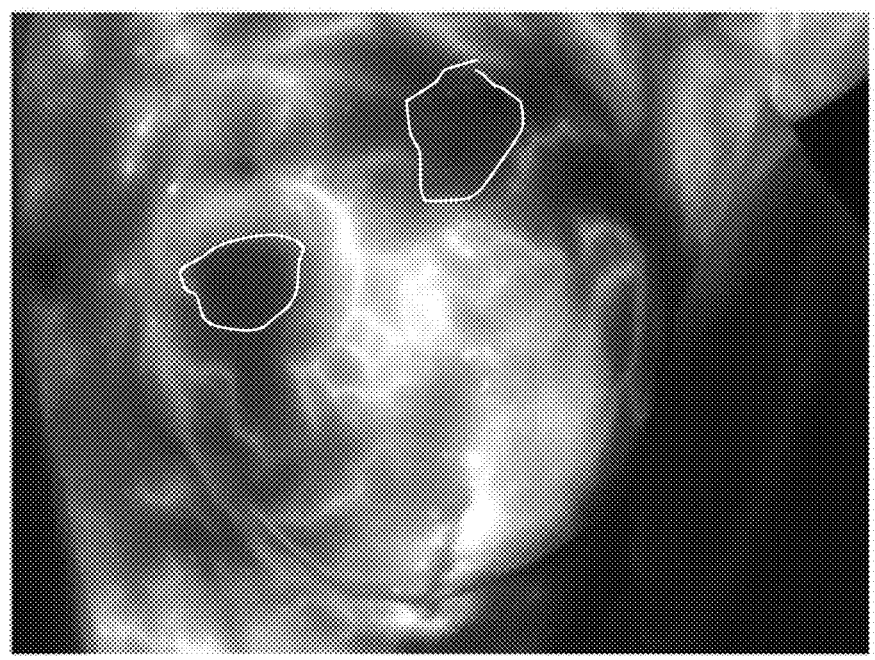
FIG. 3B illustrates a fluorescence image of tissue of the first subject identifying at least one area of concern of the tissue with little or no fluorescence in accordance with some examples disclosed herein.
Figure 4B:
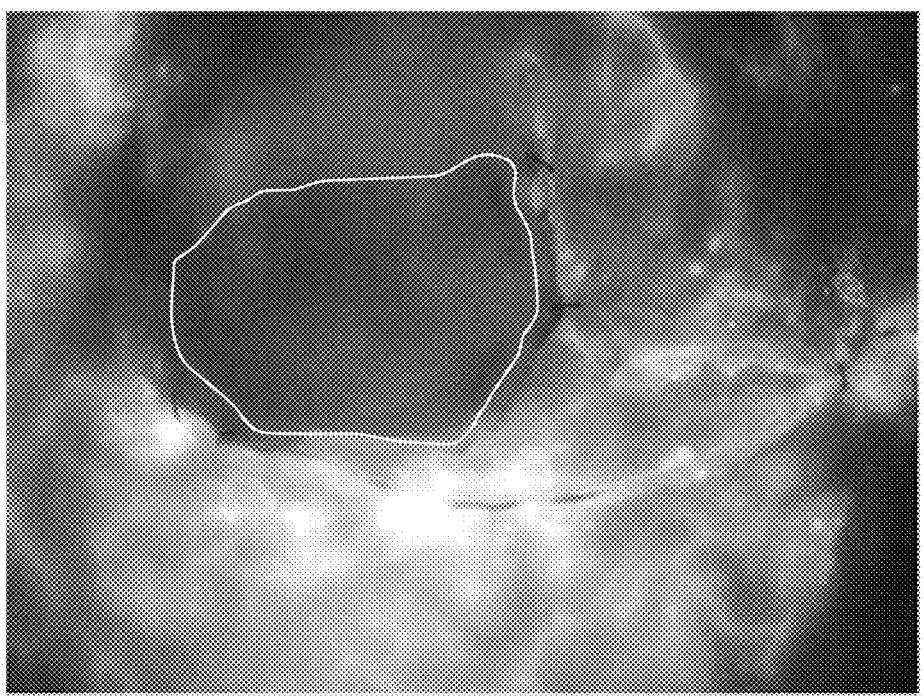
FIG. 4B illustrates a fluorescence image of tissue of the second subject identifying at least one area of concern of the tissue with little or no fluorescence in accordance with some examples disclosed herein.

In some examples, identifying at least one area of the portion of the tissue having a fluorescence intensity value that is less than a third predetermined threshold intensity value can be made by an operator of the system based on the brightness of an area(s) of the portion of the tissue in the received fluorescence image. Alternatively, or additionally, identifying at least one area of the portion of the tissue having a fluorescence intensity value that is less than a third predetermined threshold intensity value can be made, e.g. automatically, by the system based on the brightness of an area(s) of the portion of the tissue in the received fluorescence image. For example, FIGS. 3B and 4B illustrate a fluorescence image of tissue of a first subject (3B) and a second subject (4B) identifying at least one area of concern of the tissue with little or no fluorescence. Specifically, the areas of concern are circled in FIGS. 3B and 4B. The two areas of concern identified in FIG. 3B were identified at about 6 seconds after onset of fluorescence in the tissue. The one area of concern identified in FIG. 4B was identified at about 8 seconds after onset of fluorescence in the tissue.

At step 105 or 204, the method can determine when the first onset of fluorescence occurs in the at least one area of concern. This time can refer to the relative onset delay for the areas of concern in the tissue. Specifically, the method can determine when the at least one area of the portion of the tissue has a fluorescence intensity value that is greater than a fourth predetermined threshold intensity value. The first predetermined threshold intensity value and the fourth predetermined threshold intensity value can be the same. In some examples, determining when the at least one area of tissue has a fluorescence intensity value that is greater than the fourth predetermined threshold intensity value includes determining when at least one sub area within the at least one area of the tissue has a fluorescence intensity value that is greater than the fourth predetermined threshold intensity value. In some examples, the fourth predetermined threshold intensity value can be about 0-3, about 4-10, or about 5-10 out of 255 8 bit values. In some examples, the fourth predetermined threshold intensity value can be about 0-1% of max brightness or about 2-4% of maximum brightness. In some aspects, the fourth predetermined threshold intensity value can have an ingress rate of about 0.1-0.25 units of brightness increase per second.

Figure 3C:
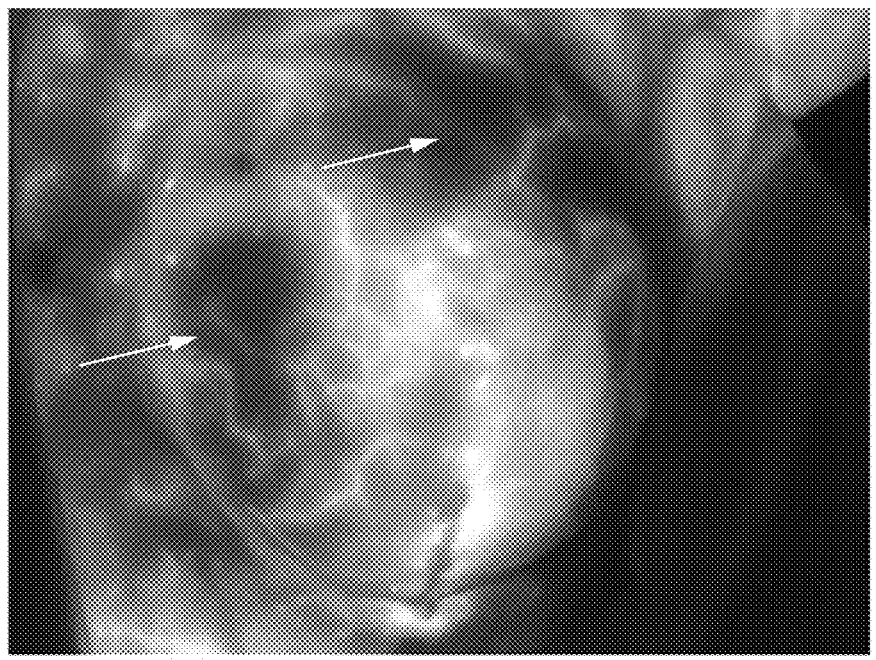
FIG. 3C illustrates a fluorescence image of tissue of the first subject when the first onset of fluorescence occurs in the at least one area of concern in accordance with some examples disclosed herein.
Figure 4C:
FIG. 4C illustrates a fluorescence image of tissue of the second subject when the first onset of fluorescence occurs in the at least one area of concern in accordance with some examples disclosed herein.
Figure 4D:
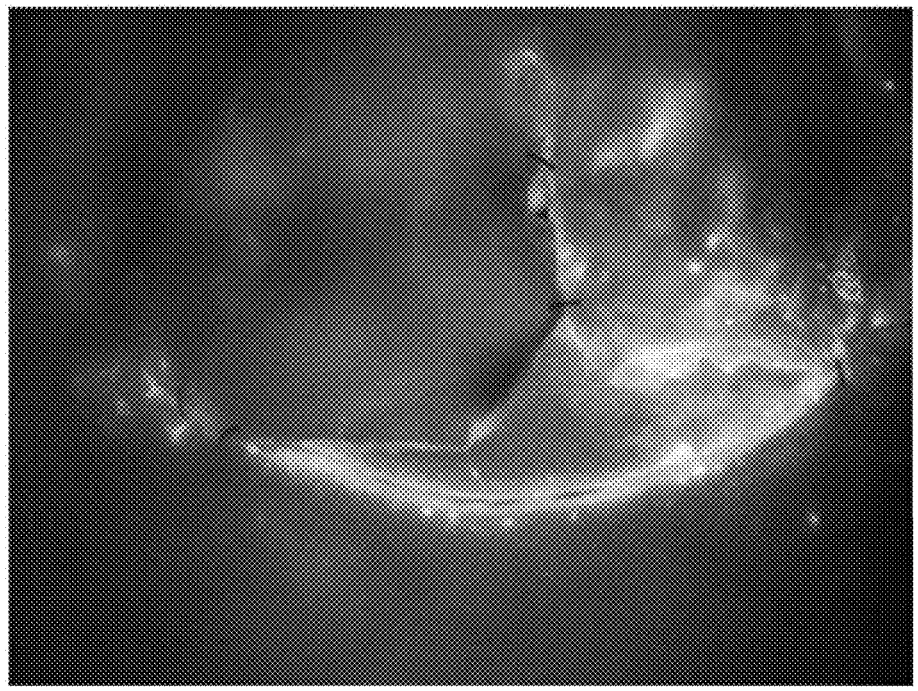
FIG. 4D illustrates an image of outcome showing that no deviation from surgical plan was necessary based on methods disclosed herein being utilized in accordance with some examples disclosed herein.

The determination when the at least one area of the portion of the tissue has a fluorescence intensity value that is greater than a fourth predetermined threshold intensity can include determining when the average fluorescence intensity value of the at least one area of the portion of the tissue is greater than a fourth predetermined threshold intensity value. In some examples, the determination of when the at least one area of the portion of the tissue has a fluorescence intensity value that is greater than a fourth predetermined threshold intensity value can be made by an operator of the system based on the brightness of the at least one area of the portion of the tissue in the received fluorescence image. Alternatively, or additionally, the determination of when the at least one area of the portion of the tissue has a fluorescence intensity value that is greater than a fourth predetermined threshold intensity value can be made, e.g. automatically, by the system based on the brightness of the at least one area of the portion of the tissue in the received fluorescence image. For example, FIGS. 3C and 4C illustrate a fluorescence image of tissue of a first subject (3C) and a second subject (4C) when the first onset of fluorescence occurs in the at least one area of concern. Specifically, arrows are pointing to where fluorescence can be seen in the at least one areas of concern previously identified in FIGS. 3B and 4B. The two areas of concern identified in FIG. 3B had their first onset of fluorescence at about 7 seconds after the initial onset of fluorescence in the tissue. The one area of concern identified in FIG. 4B had its first onset of fluorescence at about 13 seconds after the initial onset of fluorescence in the tissue.

At step 106 or 205, the method can calculate the time between when the first onset of fluorescence in the tissue occurs and when the first onset of fluorescence occurs in the at least one area of concern. Specifically, the method can calculate the time between when the at least one area of the portion of tissue has a fluorescence intensity value that is greater than the fourth predetermined threshold intensity value and when the portion of the tissue has a fluorescence intensity value that is greater than the first predetermined threshold intensity value.

The time between first onset of fluorescence in the tissue and first onset of fluorescence in the areas of concern can be used to determine if the time is significant enough to change or alter a proposed surgical plan. In some examples, if the calculated time is greater than a predetermined time, a surgical plan for the subject can be altered. For example, if the delay in onset is significant, a clinician can decide to surgically remove the area of concern or subset of this area; the clinician can delay any reconstructive surgery; the planned expander volume can be reduced or an already placed expander can be reduced in volume; the planned implant can be reduced or the surgical plan can switch from direct to implant to an expander approach; and/or treatment for possible complications can start immediately such as nitro paste, Hypebaric treatment, offloading, etc. In some examples, if the calculated time is greater than a predetermined time, the method can notify a user to consider altering a surgical plan for the subject.

In some examples, if the calculated time is greater than a predetermined time, the method can notify a user with a notification based on the calculated time being greater than the predetermined time. In some examples, the method can notify the user with a notification that the tissue might have a potential complication. This notification based on the calculated time being greater than the predetermined time can be an audio, visual (e.g., pop up on a display), or tactile notification to the user. In some examples, the predetermined time can be greater than or equal to 5 seconds, 6 seconds, 7 seconds, 8 seconds, 9 seconds, 10 seconds, 11 seconds, 12 seconds, 13 seconds, 14 seconds, 15 seconds, 20 seconds, 25 seconds, or 30 seconds. In some aspects, clinical studies may be utilized to determine the predetermined time for various procedures.

Figure 3D:
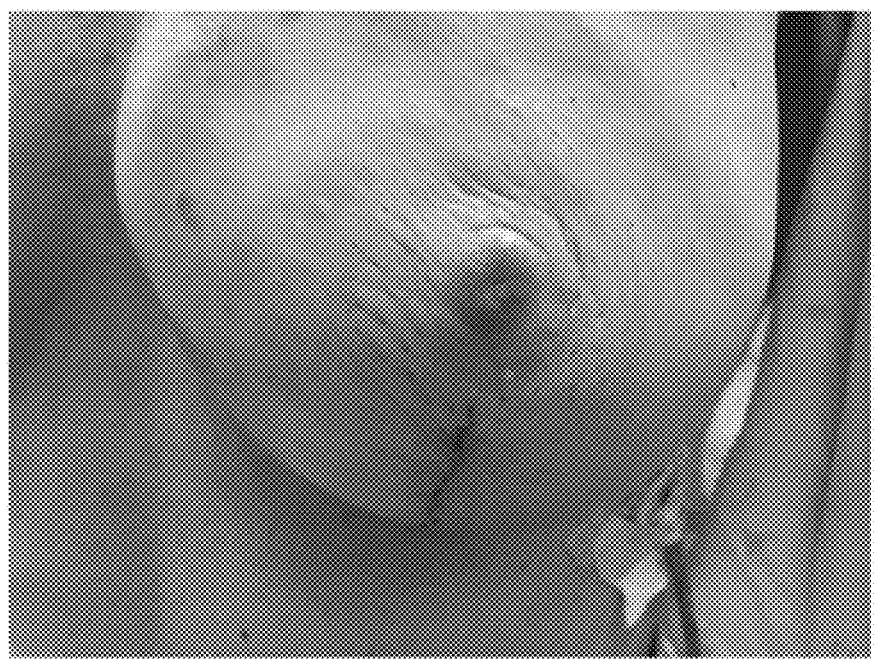
FIG. 3D illustrates an outcome image of tissue of the first subject subjected to tissue perfusion in FIGS. 3A-3C in accordance with some examples disclosed herein.
Figure 4E:
FIG. 4E illustrates an outcome image of tissue of the second subject subjected to tissue perfusion in FIGS. 4A-4D in accordance with some examples disclosed herein.
Figure 4F:
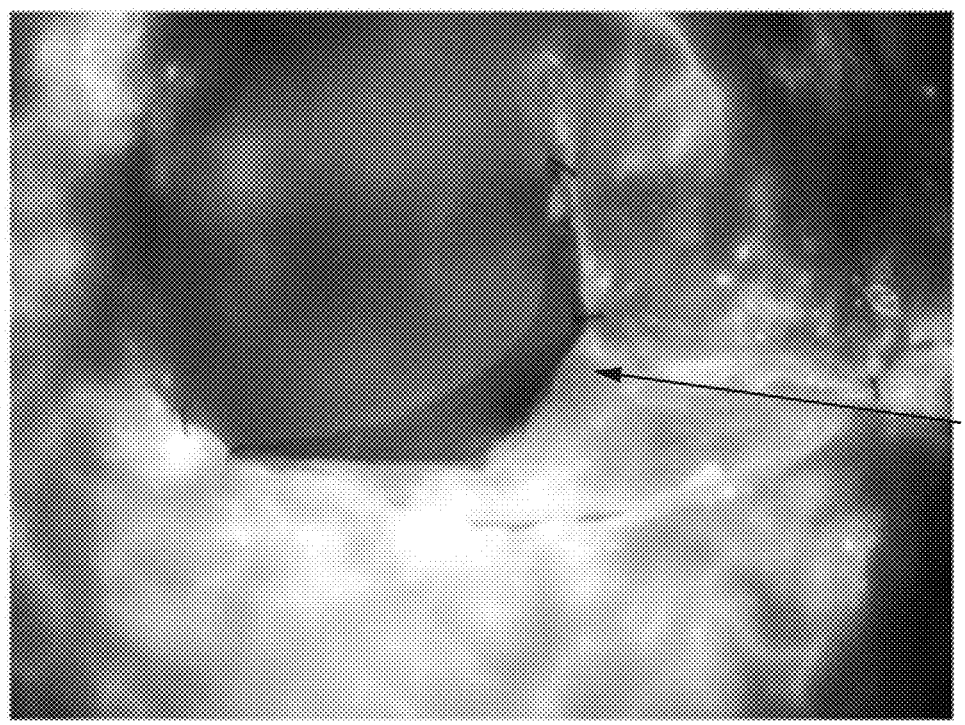
FIG. 4F illustrates an image identifying where a change to a surgical plan may have been implemented if the methods disclosed herein were utilized in accordance with some examples disclosed herein.

FIG. 3D illustrates an outcome image of tissue of the first subject subjected to tissue perfusion in FIGS. 3A-3C. As shown in FIG. 3D, the tissue survived and there were no major complications and the relative onset delay of fluorescence of the areas of concern in the first subject was about 7 seconds. In contrast, FIG. 4E illustrates an outcome image of tissue of the second subject subjected to tissue perfusion in FIGS. 4A-4D. As shown in FIG. 4E, the tissue experienced complications and the relative onset delay of fluorescence of the area of concern in the second subject was about 13 seconds. If the method disclosed herein was utilized in this second subject, a user would have known that the tissue might have had a complication. As such, the user might have been able to change the surgical plan of the subject. For example, FIG. 4F shows that the edges of the subject shown in the figure could have been excised and/or treated. In addition, reconstruction could have been alternately delayed to avoid putting pressure on this area highlighted in FIG. 4F by adding an expander or implant.

EXAMPLES

Sixteen patients were assessed using the methods disclosed herein. All patients underwent breast reconstruction after mastectomy. Of the 16 patients, 5 had good outcomes, whereas the other 11 had complications after surgery. A good outcome is no necrosis, infection, or other complications in the tissue. A poor outcome includes at least one of these complications. The following Tables show the relative onset delay from the time of onset of perfusion in the tissue to the time of onset of perfusion in an area of concern in the tissue.

| # | Good Outcomes (sec) | # | Poor Outcomes (sec) |
|---|---|---|---|
| 1 | 6 | 1 | 42 |
| 2 | 4 | 2 | 16 |
| 3 | 6 | 3 | 15 |
| 4 | 2 | 4 | 76 |
| 5 | 8 | 5 | 13 |
| Avg | 3.2 | 6 | 42 |
|  |  | 7 | 17 |
|  |  | 8 | 12 |
|  |  | 9 | 45 |
|  |  | 10 | 37 |
|  |  | 11 | 27 |
|  |  | Avg | 34.2 |

Figure 5:
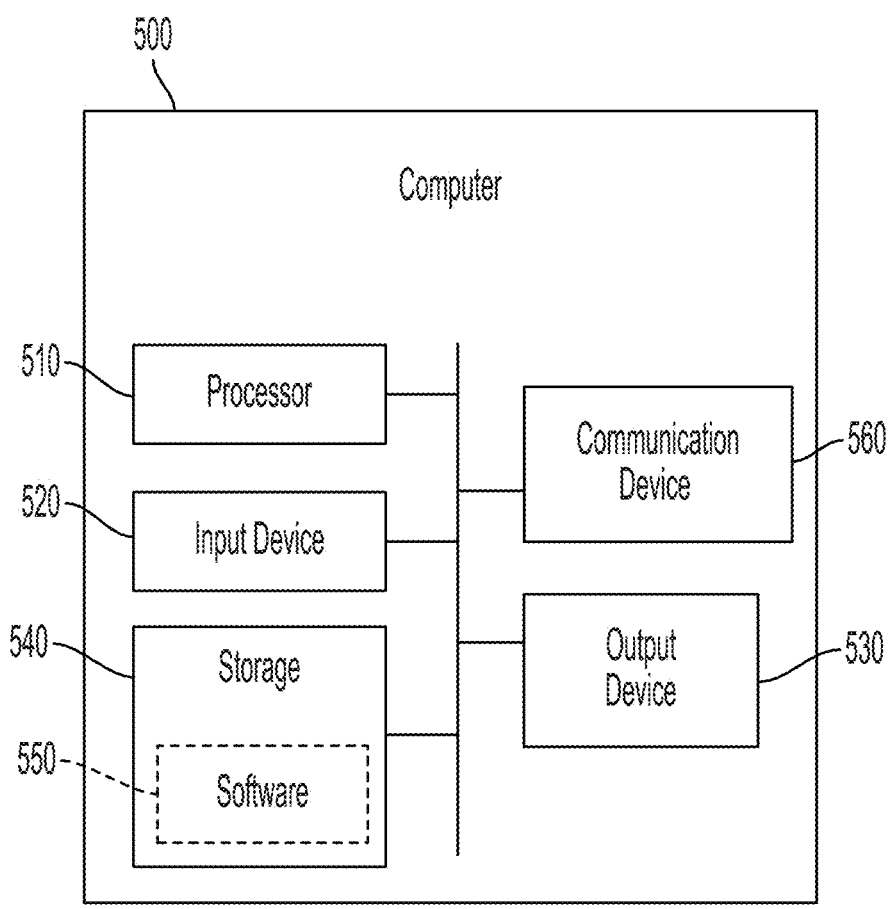
FIG. 5 depicts a computer, in accordance with some examples disclosed herein.

FIG. 5 illustrates a computer, in accordance with some examples. Computer 500 can be a component of a system or method for predicting surgical complications based on tissue perfusion, such as methods 100 or 200. In some examples, computer 500 may be configured to execute a method for predicting surgical complications based on tissue perfusion, such as all or part of methods 100 and 200 described above with respect to FIGS. 1 and 2.

Computer 500 can be a host computer connected to a network. Computer 500 can be a client computer or a server. As shown in FIG. 5, computer 500 can be any suitable type of microprocessor-based device, such as a personal computer; workstation; server; or handheld computing device, such as a phone or tablet. The computer can include, for example, one or more of processor 510, input device 520, output device 530, storage 540, and communication device 560.

Input device 520 can be any suitable device that provides input, such as a touch screen or monitor, keyboard, mouse, or voice-recognition device. Output device 530 can be any suitable device that provides output, such as a touch screen, monitor, printer, disk drive, or speaker.

Storage 540 can be any suitable device that provides storage, such as an electrical, magnetic, or optical memory, including a RAM, cache, hard drive, CD-ROM drive, tape drive, or removable storage disk. Communication device 560 can include any suitable device capable of transmitting and receiving signals over a network, such as a network interface chip or card. The components of the computer can be connected in any suitable manner, such as via a physical bus or wirelessly. Storage 540 can be a non-transitory computer-readable storage medium comprising one or more programs, which, when executed by one or more processors, such as processor 510, cause the one or more processors to execute methods described herein, such as all or part of methods 100 and 200 described above with respect to FIGS. 1-2.

Software 550, which can be stored in storage 540 and executed by processor 510, can include, for example, the programming that embodies the functionality of the present disclosure (e.g., as embodied in the systems, computers, servers, and/or devices as described above). In some examples, software 550 can be implemented and executed on a combination of servers such as application servers and database servers.

Software 550 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 500 can implement any operating system suitable for operating on the network. Software 550 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

The methods and processes described herein may be performed by code or instructions to be executed by a computer, processor, manager, or controller, or in hardware or other circuitry. Because the algorithms that form the basis of the methods (or operations of the computer, processor, or controller) are described in detail, the code or instructions for implementing the operations of the method examples may transform the computer, processor, or controller into a special-purpose processor for performing the methods described herein.

Also, another aspect may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method examples described herein.

For the purpose of clarity and a concise description, features are described herein as part of the same or separate aspects or examples; however, it will be appreciated that the scope of the disclosure includes aspects or examples having combinations of all or some of the features described.

Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "providing," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some aspects also relates to a device for performing the operations herein. This device may specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMS, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems can appear from the description above. In addition, the present disclosure is not described with reference to any particular programming language. It will be appreciated that a variety of programming languages may be used to implement the teachings of the present invention as described herein.

A kit may include any part of the systems described herein, and/or the tangible non-transitory computer-readable medium described above having computer-executable (readable) program code embedded thereon that may provide instructions for causing one or more processors, when executing the instructions, to perform one or more of the methods described herein. For instance, the instructions may cause one or more processors, when executing the instructions, to receive fluorescence image data representing an image of tissue of a subject; determine when a portion of the tissue has a fluorescence intensity value that is greater than a first predetermined threshold intensity value; determine when the portion of the tissue has a fluorescence intensity value that is greater than a second predetermined threshold intensity value; in response to determining when the portion of tissue has a fluorescence intensity value that is greater than the second predetermined threshold intensity value, identify at least one area of the portion of the tissue having a fluorescence intensity value that is less than a third predetermined threshold intensity value; determine when the at least one area of the portion of the tissue has a fluorescence intensity value that is greater than a fourth predetermined threshold intensity value; calculate time between when the at least one area of the portion of tissue has a fluorescence intensity value that is greater than the fourth predetermined threshold intensity value and when the portion of the tissue has a fluorescence intensity value that is greater than the first predetermined threshold intensity value; and if the calculated time is greater than a predetermined time, provide a notification based on the calculated time being greater than the second predetermined time. Furthermore, the kit may include instructions for use of at least some of its components (e.g., for installing the computer-executable (readable) program code with instructions embedded thereon, etc.).

In some aspects, a kit may include any part of the systems described herein and a fluorescence agent such as, for example, a fluorescence dye such as indocyanine green, ICG, or any suitable fluorescence agent or a combination of fluorescence agents. In some variations, a suitable fluorescence agent is an agent which can circulate with the blood (e.g., an agent which can circulate with, for example, a component of the blood such as plasma in the blood) and which fluoresces when exposed to appropriate excitation light energy. For example, ICG, when administered to the subject, binds with blood proteins and circulates with the blood in the tissue. The fluorescence imaging agent (e.g., ICG) may be administered to the subject as a bolus injection (e.g., into a vein or an artery) in a concentration suitable for imaging such that the bolus circulates in the vasculature and traverses the microvasculature. In other aspects in which multiple fluorescence imaging agents are used, such agents may be administered simultaneously, e.g. in a single bolus, or sequentially in separate boluses. In some aspects, the fluorescence imaging agent may be administered by a catheter. In certain aspects, the fluorescence imaging agent may be administered less than an hour in advance of performing the measurement of signal intensity arising from the fluorescence imaging agent. For example, the fluorescence imaging agent may be administered to the subject less than 30 minutes in advance of the measurement. In yet other aspects, the fluorescence imaging agent may be administered at least 30 seconds in advance of performing the measurement. In still other aspects, the fluorescence imaging agent may be administered contemporaneously with performing the measurement. According to some aspects, the fluorescence imaging agent may be administered in various concentrations to achieve a desired circulating concentration in the blood. For example, in aspects where the fluorescence imaging agent is ICG, it may be administered at a concentration of about 2.5 mg/mL to achieve a circulating concentration of about 5 µM to about 10 µM in blood. In various aspects, the upper concentration limit for the administration of the fluorescence imaging agent is the concentration at which the fluorescence imaging agent becomes clinically toxic in circulating blood, and the lower concentration limit is the instrumental limit for acquiring the signal intensity data arising from the fluorescence imaging agent circulating with blood to detect the fluorescence imaging agent. In various other aspects, the upper concentration limit for the administration of the fluorescence imaging agent is the concentration at which the fluorescence imaging agent becomes self-quenching. For example, the circulating concentration of ICG may range from about 2 µM to about 10 mM. Thus, in one aspect, the method comprises the step of administration of the imaging agent (e.g., a fluorescence imaging agent) to the subject and acquisition of the signal intensity data (e.g., video) prior to processing the signal intensity data according to the various aspects. In another aspect, the method excludes any step of administering the imaging agent to the subject.

According to some aspects, a suitable fluorescence imaging agent for use in fluorescence imaging applications to generate fluorescence image data is an imaging agent which can circulate with the blood (e.g., a fluorescence dye which can circulate with, for example, a component of the blood such as lipoproteins or serum plasma in the blood) and transit vasculature of the tissue (i.e., large vessels and microvasculature), and from which a signal intensity arises when the imaging agent is exposed to appropriate light energy (e.g., excitation light energy, or absorption light energy). In various aspects, the fluorescence imaging agent comprises a fluorescence dye, an analogue thereof, a derivative thereof, or a combination of these. An example of the fluorescence agent is a fluorescence dye, which includes any non-toxic fluorescence dye. In certain variations, the fluorescence dye may include a dye that emits light in the near-infrared spectrum. In certain aspects, the fluorescence dye may include a tricarbocyanine dye such as, for example, indocyanine green (ICG). In other variations, the fluorescence dye may comprise methylene blue, ICG or a combination thereof. In certain aspects the dye is or comprises fluorescein isothiocyanate, rhodamine, phycoerythrin, phycocyanin, allophycocyanin, o-phthaldehyde, fluorescamine, rose Bengal, trypan blue, fluoro-gold, green fluorescence protein, flavins (e.g., riboflavin, etc.), methylene blue, porphysomes, cyanine dyes (e.g., cathepsin-activated Cy5 combined with a targeting ligand, Cy5.5, etc.), IRDye800CW, CLR 1502 combined with a targeting ligand, OTL38 combined with a targeting ligand, or a combination thereof, which is excitable using excitation light wavelengths appropriate to each imaging agent. In some variations, an analogue or a derivative of the fluorescence imaging agent may be used. For example, a fluorescence dye analogue or a derivative may include a fluorescence dye that has been chemically modified, but still retains its ability to fluoresce when exposed to light energy of an appropriate wavelength. In variations in which some or all of the targeted and/or background fluorescence is derived from autofluorescence, one or more of the fluorophores or agents giving rise to the autofluorescence may be an endogenous tissue fluorophore (e.g., collagen, elastin, NADH, etc.), 5-aminolevulinic acid (5-ALA) or a derivative or product thereof, or a combination thereof. For example, 5-ALA may be converted in vivo to a product protoporphyrin IX which may emit fluorescence that may be imaged by the fluorescence imager.

In some aspects, the fluorescence imaging agent is configured to target a region of tissue and is used for visualizing the targeted region. The following is an exemplary list of imaging agents that can be used according to various aspects and the regions of tissue that they can target. ICG and/or Methylene blue may be used for targeting breast tissue, parathyroid tissue, and tumors. A proflavine agent can be used for targeting squamous cell neoplasia, Barrett's esophagus, colon polyps, dysplasia, anal dysplasia, head and neck cancer, cervical cancer, uterine cancer, oral disorders, and gastric cancer. ALA may be used for targeting gliomas, the bladder, and skin precancers and cancers. Hexaminolevulinate can be used for targeting the bladder, the cervix, and colorectal cancers. Methyl aminolevulinate can be used for targeting skin actinic keratosis, cancers, Bowen's disease, and acne. A cathepsin activatable can be used for targeting sarcomas, and colorectal, pancreatic, esophageal, breast, and prostate cancers. A protease activatable can be used for targeting breast cancer. Fluorescent lectin can be used for targeting colorectal cancer, neoplasms, and polyps. An HSP90 inhibitor can be used for targeting solid tumors. A chlorotoxin blocking chloride channels with Cy5.5 can be used for targeting gliomas, other CNS tumors, breast cancer, skin cancer, and sarcomas. A 7-aa peptide-IRDye800CW can be used for targeting gastrointestinal malignancies. A c-Met targeting peptide can be used for targeting colon cancer, esophageal cancer and high grade dysplasia, papillary thyroid cancer, and lung cancer. A folate receptor targeter can be used for targeting renal cell, lung, ovarian, pituitary, and pleural cancers. Tumor-specific integrin receptor binder can be used for targeting breast cancer. Anti-EGFR binding peptide can be used for targeting colon cancer and cholangiocarcinoma. Anti-EGFR affibody can be used for targeting gliomas, sarcomas, and head and neck cancers. GRPR receptor binding peptide can be used for targeting glioblastomas. VEGF antibody can be used for targeting esophageal cancer, breast cancer, and adenomatous polyposis. EGFR antibody can be used for targeting pancreatic cancer, brain neoplasms, gliomas, head and neck squamous cell carcinoma, and head and neck cancer. Carbonic anhydrase IX antibody can be used for targeting renal cell carcinomas.

In various aspects, the fluorescence imaging agent may be provided as a lyophilized powder, solid, or liquid. In certain aspects, the fluorescence imaging agent may be provided in a vial (e.g., a sterile vial), which may permit reconstitution to a suitable concentration by administering a sterile fluid with a sterile syringe. Reconstitution may be performed using any appropriate carrier or diluent. For example, the fluorescence imaging agent may be reconstituted with an aqueous diluent immediately before administration. In various aspects, any diluent or carrier which will maintain the fluorescence imaging agent in solution may be used. As an example, ICG may be reconstituted with water. In some aspects, once the fluorescence imaging agent is reconstituted, it may be mixed with additional diluents and carriers. In some aspects, the fluorescence imaging agent may be conjugated to another molecule, such as a protein, a peptide, an amino acid, a synthetic polymer, or a sugar, for example to enhance solubility, stability, imaging properties, or a combination thereof. Additional buffering agents may optionally be added including Tris, HCl, NaOH, phosphate buffer, and/or HEPES.

A person of skill in the art will appreciate that, although fluorescence imaging agents were described above in detail, other imaging agents may be used in connection with the systems, methods, and techniques described herein, depending on the medical imaging modality.

In some variations, the fluorescence imaging agent used in combination with the methods, systems and kits described herein may be used for blood flow imaging, tissue perfusion imaging, lymphatic imaging, or a combination thereof, which may be performed during an invasive surgical procedure, a minimally invasive surgical procedure, a non-invasive surgical procedure, or a combination thereof. Examples of invasive surgical procedure which may involve blood flow and tissue perfusion include a cardiac-related surgical procedure (e.g., CABG on pump or off pump) or a reconstructive surgical procedure. An example of a non-invasive or minimally invasive procedure includes wound (e.g., chronic wound such as for example pressure ulcers) treatment and/or management. In this regard, for example, a change in the wound over time, such as a change in wound dimensions (e.g., diameter, area), or a change in tissue perfusion in the wound and/or around the peri-wound, may be tracked over time with the application of the methods and systems. Examples of lymphatic imaging include identification of one or more lymph nodes, lymph node drainage, lymphatic mapping, or a combination thereof. In some variations, such lymphatic imaging may relate to the female reproductive system (e.g., uterus, cervix, vulva).

In variations relating to cardiac applications or any vascular applications, the imaging agent(s) (e.g., ICG alone or in combination with another imaging agent) may be injected intravenously. For example, the imaging agent may be injected intravenously through the central venous line, bypass pump and/or cardioplegia line and/or other vasculature to flow and/or perfuse the coronary vasculature, microvasculature and/or grafts. ICG may be administered as a dilute ICG/blood/saline solution down the grafted vessel or other vasculature such that the final concentration of ICG in the coronary artery or other vasculature depending on application is approximately the same or lower as would result from injection of about 2.5 mg (i.e., 1 ml of 2.5 mg/ml) into the central line or the bypass pump. The ICG may be prepared by dissolving, for example, 25 mg of the solid in 10 ml sterile aqueous solvent, which may be provided with the ICG by the manufacturer. One milliliter of the ICG solution may be mixed with 500 ml of sterile saline (e.g., by injecting 1 ml of ICG into a 500 ml bag of saline). Thirty milliliters of the dilute ICG/saline solution may be added to 10 ml of the subject's blood, which may be obtained in an aseptic manner from the central arterial line or the bypass pump. ICG in blood binds to plasma proteins and facilitates preventing leakage out of the blood vessels. Mixing of ICG with blood may be performed using standard sterile techniques within the sterile surgical field. Ten ml of the ICG/saline/blood mixture may be administered for each graft. Rather than administering ICG by injection through the wall of the graft using a needle, ICG may be administered by means of a syringe attached to the (open) proximal end of the graft. When the graft is harvested surgeons routinely attach an adaptor to the proximal end of the graft so that they can attach a saline filled syringe, seal off the distal end of the graft and inject saline down the graft, pressurizing the graft and thus assessing the integrity of the conduit (with respect to leaks, side branches etc.) prior to performing the first anastomosis. In other variations, the methods, dosages or a combination thereof as described herein in connection with cardiac imaging may be used in any vascular and/or tissue perfusion imaging applications.

Lymphatic mapping is an important part of effective surgical staging for cancers that spread through the lymphatic system (e.g., breast, gastric, gynecological cancers). Excision of multiple nodes from a particular node basin can lead to serious complications, including acute or chronic lymphedema, paresthesia, and/or seroma formation, when in fact, if the sentinel node is negative for metastasis, the surrounding nodes will most likely also be negative. Identification of the tumor draining lymph nodes (LN) has become an important step for staging cancers that spread through the lymphatic system in breast cancer surgery for example. LN mapping involves the use of dyes and/or radiotracers to identify the LNs either for biopsy or resection and subsequent pathological assessment for metastasis. The goal of lymphadenectomy at the time of surgical staging is to identify and remove the LNs that are at high risk for local spread of the cancer. Sentinel lymph node (SLN) mapping has emerged as an effective surgical strategy in the treatment of breast cancer. It is generally based on the concept that metastasis (spread of cancer to the axillary LNs), if present, should be located in the SLN, which is defined in the art as the first LN or group of nodes to which cancer cells are most likely to spread from a primary tumor. If the SLN is negative for metastasis, then the surrounding secondary and tertiary LN should also be negative. The primary benefit of SLN mapping is to reduce the number of subjects who receive traditional partial or complete lymphadenectomy and thus reduce the number of subjects who suffer from the associated morbidities such as lymphedema and lymphocysts.

The current standard of care for SLN mapping involves injection of a tracer that identifies the lymphatic drainage pathway from the primary tumor. The tracers used may be radioisotopes (e.g. Technetium-99 or Tc-99m) for intraoperative localization with a gamma probe. The radioactive tracer technique (known as scintigraphy) is limited to hospitals with access to radioisotopes require involvement of a nuclear physician and does not provide real-time visual guidance. A colored dye, isosulfan blue, has also been used, however this dye cannot be seen through skin and fatty tissue. In addition, blue staining results in tattooing of the breast lasting several months, skin necrosis can occur with subdermal injections, and allergic reactions with rare anaphylaxis have also been reported. Severe anaphylactic reactions have occurred after injection of isosulfan blue (approximately 2% of patients). Manifestations include respiratory distress, shock, angioedema, urticarial and pruritus. Reactions are more likely to occur in subjects with a history of bronchial asthma, or subjects with allergies or drug reactions to triphenylmethane dyes. Isosulfan blue is known to interfere with measurements of oxygen saturation by pulse oximetry and methemoglobin by gas analyzer. The use of isosulfan blue may result in transient or long-term (tattooing) blue coloration.

In contrast, fluorescence imaging in accordance with the various aspects for use in SLN visualization, mapping, facilitates direct real-time visual identification of a LN and/or the afferent lymphatic channel intraoperatively, facilitates high-resolution optical guidance in real-time through skin and fatty tissue, visualization of blood flow, tissue perfusion or a combination thereof.

In some variations, visualization, classification or both of lymph nodes during fluorescence imaging may be based on imaging of one or more imaging agents, which may be further based on visualization and/or classification with a gamma probe (e.g., Technetium Tc-99m is a clear, colorless aqueous solution and is typically injected into the periareolar area as per standard care), another conventionally used colored imaging agent (isosulfan blue), and/or other assessment such as, for example, histology. The breast of a subject may be injected, for example, twice with about 1% isosulfan blue (for comparison purposes) and twice with an ICG solution having a concentration of about 2.5 mg/ml. The injection of isosulfan blue may precede the injection of ICG or vice versa. For example, using a TB syringe and a 30 G needle, the subject under anesthesia may be injected with 0.4 ml (0.2 ml at each site) of isosulfan blue in the periareolar area of the breast. For the right breast, the subject may be injected at 12 and 9 o'clock positions and for the left breast at 12 and 3 o'clock positions. The total dose of intradermal injection of isosulfan blue into each breast may be about 4.0 mg (0.4 ml of 1% solution: 10 mg/ml). In another exemplary variation, the subject may receive an ICG injection first followed by isosulfan blue (for comparison). One 25 mg vial of ICG may be reconstituted with 10 ml sterile water for injection to yield a 2.5 mg/ml solution immediately prior to ICG administration. Using a TB syringe and a 30G needle, for example, the subject may be injected with about 0.1 ml of ICG (0.05 ml at each site) in the periareolar area of the breast (for the right breast, the injection may be performed at 12 and 9 o'clock positions and for the left breast at 12 and 3 o'clock positions). The total dose of intradermal injection of ICG into each breast may be about 0.25 mg (0.1 ml of 2.5 mg/ml solution) per breast. ICG may be injected, for example, at a rate of 5 to 10 seconds per injection. When ICG is injected intradermally, the protein binding properties of ICG cause it to be rapidly taken up by the lymph and moved through the conducting vessels to the LN. In some variations, the ICG may be provided in the form of a sterile lyophilized powder containing 25 mg ICG with no more than 5% sodium iodide. The ICG may be packaged with aqueous solvent consisting of sterile water for injection, which is used to reconstitute the ICG. In some variations the ICG dose (mg) in breast cancer sentinel lymphatic mapping may range from about 0.5 mg to about 10 mg depending on the route of administration. In some variations, the ICG does may be about 0.6 mg to about 0.75 mg, about 0.75 mg to about 5 mg, about 5 mg to about 10 mg. The route of administration may be for example subdermal, intradermal (e.g., into the periareolar region), subareolar, skin overlaying the tumor, intradermal in the areola closest to tumor, subdermal into areola, intradermal above the tumor, periareolar over the whole breast, or a combination thereof. The NIR fluorescent positive LNs (e.g., using ICG) may be represented as a black and white NIR fluorescence image(s) for example and/or as a full or partial color (white light) image, full or partial desaturated white light image, an enhanced colored image, an overlay (e.g., fluorescence with any other image), a composite image (e.g., fluorescence incorporated into another image) which may have various colors, various levels of desaturation or various ranges of a color to highlight/visualize certain features of interest. Processing of the images may be further performed for further visualization and/or other analysis (e.g., quantification). The lymph nodes and lymphatic vessels may be visualized (e.g., intraoperatively, in real time) using fluorescence imaging systems and methods according to the various aspects for ICG and SLNs alone or in combination with a gamma probe (Tc-99m) according to American Society of Breast Surgeons (ASBrS) practice guidelines for SLN biopsy in breast cancer patients. Fluorescence imaging for LNs may begin from the site of injection by tracing the lymphatic channels leading to the LNs in the axilla. Once the visual images of LNs are identified, LN mapping and identification of LNs may be done through incised skin, LN mapping may be performed until ICG visualized nodes are identified. For comparison, mapping with isosulfan blue may be performed until 'blue' nodes are identified. LNs identified with ICG alone or in combination with another imaging technique (e.g., isosulfan blue, and/or Tc-99m) may be labeled to be excised. Subject may have various stages of breast cancer (e.g., IA, IB, IIA).

In some variations, such as for example, in gynecological cancers (e.g., uterine, endometrial, vulvar and cervical malignancies), ICG may be administered interstitially for the visualization of lymph nodes, lymphatic channels, or a combination thereof. When injected interstitially, the protein binding properties of ICG cause it to be rapidly taken up by the lymph and moved through the conducting vessels to the SLN. ICG may be provided for injection in the form of a sterile lyophilized powder containing 25 mg ICG (e.g., 25 mg/vial) with no more than 5.0% sodium iodide. ICG may be then reconstituted with commercially available water (sterile) for injection prior to use. According to an aspect, a vial containing 25 mg ICG may be reconstituted in 20 ml of water for injection, resulting in a 1.25 mg/ml solution. A total of 4 ml of this 1.25 mg/ml solution is to be injected into a subject (4×1 ml injections) for a total dose of ICG of 5 mg per subject. The cervix may also be injected four (4) times with a 1 ml solution of 1% isosulfan blue 10 mg/ml (for comparison purposes) for a total dose of 40 mg. The injection may be performed while the subject is under anesthesia in the operating room. In some variations the ICG dose (mg) in gynecological cancer sentinel lymph node detection and/or mapping may range from about 0.1 mg to about 5 mg depending on the route of administration. In some variations, the ICG does may be about 0.1 mg to about 0.75 mg, about 0.75 mg to about 1.5 mg, about 1.5 mg to about 2.5 mg, about 2.5 mg to about 5 mg. The route of administration may be for example cervical injection, vulva peritumoral injection, hysteroscopic endometrial injection, or a combination thereof. In order to minimize the spillage of isosulfan blue or ICG interfering with the mapping procedure when LNs are to be excised, mapping may be performed on a hemi-pelvis, and mapping with both isosulfan blue and ICG may be performed prior to the excision of any LNs. LN mapping for Clinical Stage I endometrial cancer may be performed according to the NCCN Guidelines for Uterine Neoplasms, SLN Algorithm for Surgical Staging of Endometrial Cancer; and SLN mapping for Clinical Stage I cervical cancer may be performed according to the NCCN Guidelines for Cervical Neoplasms, Surgical/SLN Mapping Algorithm for Early-Stage Cervical Cancer. Identification of LNs may thus be based on ICG fluorescence imaging alone or in combination or co-administration with for a colorimetric dye (isosulfan blue) and/or radiotracer.

Visualization of lymph nodes may be qualitative and/or quantitative. Such visualization may comprise, for example, lymph node detection, detection rate, anatomic distribution of lymph nodes. Visualization of lymph nodes according to the various aspects may be used alone or in combination with other variables (e.g., vital signs, height, weight, demographics, surgical predictive factors, relevant medical history and underlying conditions, histological visualization and/or assessment, Tc-99m visualization and/or assessment, concomitant medications). Follow-up visits may occur on the date of discharge, and subsequent dates (e.g., one month).

Lymph fluid comprises high levels of protein, thus ICG can bind to endogenous proteins when entering the lymphatic system. Fluorescence imaging (e.g., ICG imaging) for lymphatic mapping when used in accordance with the methods and systems described herein offers the following example advantages: high-signal to background ratio (or tumor to background ratio) as NIR does not generate significant autofluorescence, real-time visualization feature for lymphatic mapping, tissue definition (i.e., structural visualization), rapid excretion and elimination after entering the vascular system, and avoidance of non-ionizing radiation. Furthermore, NIR imaging has superior tissue penetration (approximately 5 to 10 millimeters of tissue) to that of visible light (1 to 3 mm of tissue). The use of ICG for example also facilitates visualization through the peritoneum overlying the para-aortic nodes. Although tissue fluorescence can be observed with NIR light for extended periods, it cannot be seen with visible light and consequently does not impact pathologic evaluation or processing of the LN. Also, florescence is easier to detect intraoperatively than blue staining (isosulfan blue) of lymph nodes. In other variations, the methods, dosages or a combination thereof as described herein in connection with lymphatic imaging may be used in any vascular and/or tissue perfusion imaging applications.

Tissue perfusion relates to the microcirculatory flow of blood per unit tissue volume in which oxygen and nutrients are provided to and waste is removed from the capillary bed of the tissue being perfused. Tissue perfusion is a phenomenon related to but also distinct from blood flow in vessels. Quantified blood flow through blood vessels may be expressed in terms that define flow (i.e., volume/time), or that define speed (i.e., distance/time). Tissue blood perfusion defines movement of blood through micro-vasculature, such as arterioles, capillaries, or venules, within a tissue volume. Quantified tissue blood perfusion may be expressed in terms of blood flow through tissue volume, namely, that of blood volume/time/tissue volume (or tissue mass). Perfusion is associated with nutritive blood vessels (e.g., micro-vessels known as capillaries) that comprise the vessels associated with exchange of metabolites between blood and tissue, rather than larger-diameter non-nutritive vessels. In some aspects, quantification of a target tissue may include calculating or determining a parameter or an amount related to the target tissue, such as a rate, size volume, time, distance/time, and/or volume/time, and/or an amount of change as it relates to any one or more of the preceding parameters or amounts. However, compared to blood movement through the larger diameter blood vessels, blood movement through individual capillaries can be highly erratic, principally due to vasomotion, wherein spontaneous oscillation in blood vessel tone manifests as pulsation in erythrocyte movement.

One or more aspects are directed to a fluorescence imaging agent for use in the imaging systems and methods as described herein. In one or more aspects, the use may comprise blood flow imaging, tissue perfusion imaging, lymphatic imaging, or a combination thereof, which may occur during an invasive surgical procedure, a minimally invasive surgical procedure, a non-invasive surgical procedure, or a combination thereof. The fluorescence agent may be included in the kit described herein.

In one or more aspects, the invasive surgical procedure may comprise a cardiac-related surgical procedure or a reconstructive surgical procedure. The cardiac-related surgical procedure may comprise a cardiac coronary artery bypass graft (CABG) procedure which may be on pump and/or off pump.

In one or more aspects, the minimally invasive or the non-invasive surgical procedure may comprise a wound care procedure.

In one or more aspects, the lymphatic imaging may comprise identification of a lymph node, lymph node drainage, lymphatic mapping, or a combination thereof. The lymphatic imaging may relate to the female reproductive system.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method comprising:
receiving fluorescence image data representing an image of tissue of a subject;
dividing the received fluorescence image data into a plurality of different portions;
determining an average fluorescence intensity value of pixels in each of the plurality of different portions of the received fluorescence image data;
determining when a first portion of the plurality of different portions of the received fluorescence image data has a first average fluorescence intensity value that is greater than a first predetermined threshold intensity value;

determining when the first portion of the plurality of different portions of the received fluorescence image data has a second average fluorescence intensity value that is greater than a second predetermined threshold intensity value;

in response to determining when the first portion of the plurality of different portions of the received fluorescence image data has the second average fluorescence intensity value that is greater than the second predetermined threshold intensity value, identifying a second portion of the plurality of different portions of the received fluorescence image data having a third average fluorescence intensity value that is less than a third predetermined threshold intensity value;

determining when the second portion of the plurality of different portions of the received fluorescence image data has a fourth average fluorescence intensity value that is greater than a fourth predetermined threshold intensity value;

calculating time between when the second portion of the plurality of different portions of the received fluorescence image data has the fourth average fluorescence intensity value that is greater than the fourth predetermined threshold intensity value and when the first portion of the plurality of different portions of the received fluorescence image data has the first average fluorescence intensity value that is greater than the first predetermined threshold intensity value;

determining whether the tissue has a potential tissue perfusion complication based on the calculated time being greater than the predetermined time; and providing a visual notification based on the determination of whether the tissue has a potential tissue perfusion complication.

2. The method of claim 1, wherein the second predetermined threshold intensity value is greater than the first predetermined threshold intensity value.

3. The method of claim 1, wherein the third predetermined threshold intensity value is less than the first predetermined threshold intensity value.

4. The method of claim 1, wherein the first predetermined threshold intensity value and the fourth predetermined threshold intensity value are the same.

5. The method of claim 1, wherein the fluorescence image data representing the image of a subject is continuously received.

6. The method of claim 1, wherein the predetermined time is 10 seconds.

7. The method of claim 1, further comprising in response to the visual notification based on the determination of whether the tissue has a potential tissue perfusion complication, altering a surgical plan for the subject.

8. The method of claim 1, wherein the notification comprises a second notification to consider altering a surgical plan for the subject.

9. A method comprising:
receiving fluorescence image data representing an image of tissue of a subject;
dividing the received fluorescence image data into a plurality of different portions;
determining an average fluorescence intensity value of pixels in each of the plurality of different portions of the received fluorescence image data;
determining when a first portion of the plurality of different portions of the received fluorescence image data has a first average fluorescence intensity value that is greater than a first predetermined threshold intensity value;

at a first predetermined time after determining when the first portion of the plurality of different portions of the received fluorescence image data has the first average fluorescence intensity value that is greater than the first predetermined threshold intensity value, identifying a second portion of the plurality of different portions of the received fluorescence image data having a second average fluorescence intensity value that is less than a second predetermined threshold intensity value;

determining when the second portion of the plurality of different portions of the received fluorescence image data has a third average fluorescence intensity value that is greater than a third predetermined threshold intensity value;

calculating time between when the second portion of the plurality of different portions of the received fluorescence image data has the third average fluorescence intensity value that is greater than the third predetermined threshold intensity value and when the first portion of the plurality of different portions of the received fluorescence image data has the first average fluorescence intensity value that is greater than the first predetermined threshold intensity value;

determining whether the tissue has a potential tissue perfusion complication based on the calculated time being greater than the second predetermined time; and providing a visual notification based on the determination of whether the tissue has a potential tissue perfusion complication.

10. A system comprising one or more processors configured to cause the system to:
receive fluorescence image data representing an image of tissue of a subject;
divide the received fluorescence image data into a plurality of different portions;
determine an average fluorescence intensity value of pixels in each of the plurality of different portions of the received fluorescence image data;
determine when a first portion of the plurality of different portions of the received fluorescence image data has a first average fluorescence intensity value that is greater than a first predetermined threshold intensity value;
determine when the first portion of the plurality of different portions of the received fluorescence image data has a second average fluorescence intensity value that is greater than a second predetermined threshold intensity value;
in response to determining when the first portion of the plurality of different portions of the received fluorescence image data has the second average fluorescence intensity value that is greater than the second predetermined threshold intensity value, identify a second portion of the plurality of different portions of the received fluorescence image data having a third average fluorescence intensity value that is less than a third predetermined threshold intensity value;
determine when the second portion of the plurality of different portions of the received fluorescence image data has a fourth average fluorescence intensity value that is greater than a fourth predetermined threshold intensity value;

calculate time between when the second portion of the plurality of different portions of the received fluorescence image data has the fourth average fluorescence intensity value that is greater than the fourth predetermined threshold intensity value and when the first portion of the plurality of different portions of the received fluorescence image data has the first average fluorescence intensity value that is greater than the first predetermined threshold intensity value;

determine whether the tissue has a potential tissue perfusion complication based on the calculated time being greater than the predetermined time; and provide a visual notification based on the determination of whether the tissue has a potential tissue perfusion complication.

11. A non-transitory computer-readable storage medium, the non-transitory computer-readable storage medium storing instructions configured to be executed by a system comprising one or more processors to cause the system to:

receive fluorescence image data representing an image of tissue of a subject;

divide the received fluorescence image data into a plurality of different portions;

determine an average fluorescence intensity value of pixels in each of the plurality of different portions of the received fluorescence image data;

determine when a first portion of the plurality of different portions of the received fluorescence image data has a first average fluorescence intensity value that is greater than a first predetermined threshold intensity value;

determine when the first portion of the plurality of different portions of the received fluorescence image data has a second average fluorescence intensity value that is greater than a second predetermined threshold intensity value;

in response to determining when the first portion of the plurality of different portions of the received fluorescence image data has the second average fluorescence intensity value that is greater than the second predetermined threshold intensity value, identify a second portion of the plurality of different portions of the received fluorescence image data having a third average fluorescence intensity value that is less than a third predetermined threshold intensity value;

determine when the second portion of the plurality of different portions of the received fluorescence image data has a fourth average fluorescence intensity value that is greater than a fourth predetermined threshold intensity value;

calculate time between when the second portion of the plurality of different portions of the received fluorescence image data has the fourth average fluorescence intensity value that is greater than the fourth predetermined threshold intensity value and when the first portion of the plurality of different portions of the received fluorescence image data has the first average fluorescence intensity value that is greater than the first predetermined threshold intensity value;

determine whether the tissue has a potential tissue perfusion complication based on the calculated time being greater than the predetermined time; and provide a visual notification based on the determination of whether the tissue has a potential tissue perfusion complication.

\* \* \* \* \*